(12) United States Patent
Bhogal et al.

(10) Patent No.: US 8,881,244 B2
(45) Date of Patent: Nov. 4, 2014

(54) AUTHORIZING COMPUTING RESOURCE ACCESS BASED ON CALENDAR EVENTS IN A NETWORKED COMPUTING ENVIRONMENT

(75) Inventors: Kulvir S. Bhogal, Pflugerville, TX (US); Lisa Seacat DeLuca, San Francisco, CA (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/572,970

(22) Filed: Aug. 13, 2012

(65) Prior Publication Data

US 2014/0047509 A1  Feb. 13, 2014

(51) Int. Cl.
G06F 21/00 (2013.01)
G06Q 10/06 (2012.01)

(52) U.S. Cl.
CPC .............................. G06Q 10/06314 (2013.01)
USPC .............. 726/4; 726/1; 726/3; 726/7; 726/28; 726/29; 709/203; 709/204; 709/205; 709/219; 709/246; 705/7.19; 705/41; 705/7.16; 705/7.24; 705/7.26; 713/165; 713/193; 719/318

(58) Field of Classification Search
CPC ... G06Q 10/109; G06Q 10/10; G06Q 10/103; G06Q 10/1095; G06Q 10/06314; G06F 21/6209; G06F 21/00
See application file for complete search history.

(56) References Cited

U.S. PATENT DOCUMENTS

| | | | |
|---|---|---|---|
| 6,085,205 A | 7/2000 | Peairs et al. | |
| 6,675,356 B1 | 1/2004 | Adler et al. | |
| 7,441,194 B2 | 10/2008 | Vronay et al. | |
| 7,805,676 B2 | 9/2010 | Schemers et al. | |
| 8,121,880 B2 | 2/2012 | O'Sullivan et al. | |
| 2006/0010197 A1* | 1/2006 | Ovenden | 709/204 |
| 2006/0116918 A1* | 6/2006 | Flora et al. | 705/8 |
| 2007/0240079 A1* | 10/2007 | Flynt et al. | 715/810 |
| 2008/0033957 A1 | 2/2008 | Forstall et al. | |
| 2008/0091499 A1* | 4/2008 | Barber-Mingo et al. | 705/9 |

(Continued)

OTHER PUBLICATIONS

Heinz Tschabitscher, How to Link Google Docs Files with Google Calendar Events Easily, About.com (WaybackMachine dated Jan. 14, 2011) (available at http://email.about.com/od/googlecalendartips/qt/Link_Google_Docs_Files_With_Google_Calendar_Events.htm).*

(Continued)

Primary Examiner — Morshed Mehedi
Assistant Examiner — Sharon Lynch
(74) Attorney, Agent, or Firm — William E. Schiesser; Keohane & D'Alessandro, PLLC

(57) ABSTRACT

An approach for authorizing access to computing resources (e.g., electronic files) based on calendar events (e.g., meetings of a user) in a networked computing environment (e.g., a cloud computing environment) is provided. A portion/segment (e.g., private cloud) of the networked computing environment may be designated for storing at least one electronic file to be shared (e.g., as stored in a computer storage device associated with the portion). The portion of the networked computing environment may then be associated (e.g., graphically) with an electronic calendar entry (e.g., a meeting having a set of attendees). Based on the calendar entry, a set of users (e.g., the meeting attendees) authorized to access the at least one electronic file may be determined based on the electronic calendar entry. Thereafter, access (e.g., a related permissions) to the at least one electronic file may be authorized for the set of users.

16 Claims, 7 Drawing Sheets

(56) References Cited

U.S. PATENT DOCUMENTS

| | | | |
|---|---|---|---|
| 2008/0294999 | A1  | 11/2008 | Bank et al. |
| 2008/0319818 | A1* | 12/2008 | Gurdin et al. ............... 705/8 |
| 2009/0222747 | A1* | 9/2009  | May et al. ............... 715/764 |
| 2009/0282361 | A1* | 11/2009 | Cortright ............... 715/786 |
| 2009/0327433 | A1* | 12/2009 | Comertoglu et al. ....... 709/206 |
| 2010/0235216 | A1* | 9/2010  | Hehmeyer et al. ............. 705/9 |
| 2010/0332479 | A1* | 12/2010 | Prahlad et al. ............ 707/741 |
| 2011/0137991 | A1* | 6/2011  | Russell ............... 709/204 |
| 2011/0246817 | A1* | 10/2011 | Orsini et al. ............. 714/6.1 |
| 2011/0320536 | A1* | 12/2011 | Lobb et al. ............. 709/205 |
| 2012/0023595 | A1* | 1/2012  | Speare et al. ............. 726/28 |
| 2012/0197523 | A1* | 8/2012  | Kirsch ............... 701/426 |
| 2012/0317215 | A1* | 12/2012 | Brunner ............... 709/206 |
| 2012/0323777 | A1* | 12/2012 | Liberty ............... 705/41 |
| 2013/0007845 | A1* | 1/2013  | Chang et al. ............. 726/4 |
| 2013/0060839 | A1* | 3/2013  | Van Biljon et al. ......... 709/203 |
| 2013/0067550 | A1* | 3/2013  | Chen et al. ............... 726/7 |
| 2013/0117806 | A1* | 5/2013  | Parthasarathy et al. ......... 726/1 |
| 2013/0144939 | A1* | 6/2013  | Prahlad ............... 709/203 |
| 2013/0151637 | A1* | 6/2013  | Bedikian ............... 709/206 |
| 2013/0218982 | A1* | 8/2013  | Hymel et al. ............. 709/206 |
| 2013/0238487 | A1* | 9/2013  | Biske ............... 705/39 |
| 2013/0254847 | A1* | 9/2013  | Adams et al. ............. 726/4 |
| 2013/0311986 | A1* | 11/2013 | Arrouye et al. ............ 717/175 |
| 2014/0013413 | A1* | 1/2014  | Roher et al. ............. 726/12 |

OTHER PUBLICATIONS

Attach a File to a Google Calendar Event, BroncoBytes (Mar. 16, 2009) (available at http://broncobytes.boisestate.edu/blog/2009/03/16/attach-a-file-to-a-google-calendar-event/).*

Calendar Product Tour, GoDaddy Group Calendar (WayBackMachine dated Jan. 1, 2011) (available at https://www.godaddy.com/calendar/online-calendar.aspx).*

Working with Attachments, Outlook Web App (WaybackMachine dated Jan. 4, 2012) (available at http://help.outlook.com/en-US/140/ms.exch.owap.AttachmentPremium.aspx).*

Setting Up Your Calendar, Google, (WayBackMachine dated May 22, 2012) (available at http://www.google.com/support/enterprise/static/gapps/docs/users/en/learning_center/faqs_calendar.html).*

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Tschabitscher, H., "How to Link Google Docs Files With Google Calendar Events Easily", About.com email newsletter, 2 pages. No publication date cited.

Feinberg, J., "Cattail: Person-Centric Sharing for IBMers", Watson Research Center, 1 page. No publication date cited.

* cited by examiner

US 8,881,244 B2

AUTHORIZING COMPUTING RESOURCE ACCESS BASED ON CALENDAR EVENTS IN A NETWORKED COMPUTING ENVIRONMENT

TECHNICAL FIELD

In general, embodiments of the present invention relate to access control. Specifically, embodiments of the present invention relate to the authorization of users to access computing resource (e.g., electronic files) based on calendar events (e.g., meetings) in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud computing environments allow for greater levels of collaboration on projects or the like. Along these lines, a user/customer may desire to authorize access for a group of other users/customers to documents or other electronic files as a part of a planned meeting or the like. Challenges may exist, however, in efficiently designating such permissions. For example, if an "owner" of an electronic document wishes to allow other users access to the electronic document, the owner must typically create an access control list (ACL) or the like, and manually designate specific users and their associated permissions. Such a process may be time consuming and/or tedious, especially if the owner later desires to add or remove users and/or change permissions.

SUMMARY

Embodiments of the present invention provide an approach for authorizing access to computing resources (e.g., electronic files) based on calendar events (e.g., meetings of a user) in a networked computing environment (e.g., a cloud computing environment). In a typical embodiment a portion/segment (e.g., private cloud) of the networked computing environment may be designated for storing at least one electronic file to be shared (e.g., as stored in at least one computer storage device associated with the portion). The portion of the networked computing environment may then be associated (e.g., graphically) with an electronic calendar entry (e.g., a meeting having a set of attendees). Based on the calendar entry, a set of users (e.g., the meeting attendees) authorized to access the at least one electronic file may be determined based on the electronic calendar entry. Thereafter, access to the at least one electronic file may be authorized for the set of users (along with associated permission in an access control list (ACL) or the like).

A first aspect of the present invention provides a computer-implemented method for authorizing computing resource access based on calendar events in a networked computing environment, comprising: designating a portion of the networked computing environment for storing at least one electronic file to be shared, the at least one electronic file being stored in at least one computer storage device associated with the portion; associating the portion of the networked computing environment with an electronic calendar entry; determining a set of users authorized to access the at least one electronic file based on the electronic calendar entry; and authorizing access to the at least one electronic file for the set of users.

A second aspect of the present invention provides a system for authorizing computing resource access based on calendar events in a networked computing environment, comprising: a memory medium comprising instructions; a bus coupled to the memory medium; and a processor coupled to the bus that when executing the instructions causes the system to: designate a portion of the networked computing environment for storing at least one electronic file to be shared, the at least one electronic file being stored in at least one computer storage device associated with the portion; associate the portion of the networked computing environment with an electronic calendar entry; determine a set of users authorized to access the at least one electronic file based on the electronic calendar entry; and authorize access to the at least one electronic file for the set of users.

A third aspect of the present invention provides a computer program product for authorizing computing resource access based on calendar events in a networked computing environment, the computer program product comprising a computer readable storage media, and program instructions stored on the computer readable storage media, to: designate a portion of the networked computing environment for storing at least one electronic file to be shared, the at least one electronic file being stored in at least one computer storage device associated with the portion; associate the portion of the networked computing environment with an electronic calendar entry; determine a set of users authorized to access the at least one electronic file based on the electronic calendar entry; and authorize access to the at least one electronic file for the set of users.

A fourth aspect of the present invention provides a method for deploying a system for authorizing computing resource access based on calendar events in a networked computing environment, comprising: providing a computer infrastructure being operable to: designate a portion of the networked computing environment for storing at least one electronic file to be shared, the at least one electronic file being stored in at least one computer storage device associated with the portion; associate the portion of the networked computing environment with an electronic calendar entry; determine a set of users authorized to access the at least one electronic file based on the electronic calendar entry; and authorize access to the at least one electronic file for the set of users.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

Figure 1:
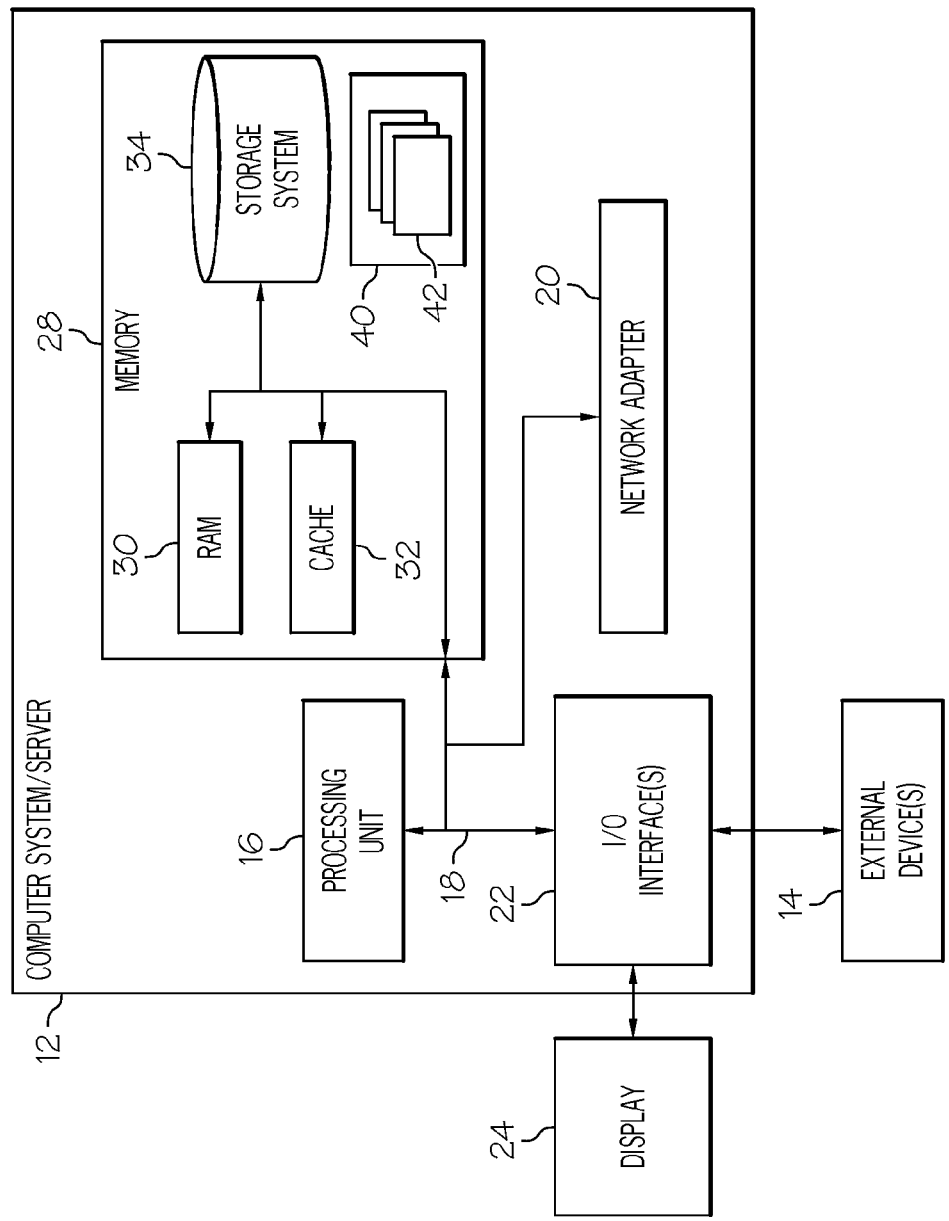
FIG. 1 depicts a cloud computing node according to an embodiment of the present invention.

Illustrative embodiments now will be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for authorizing access to computing resources (e.g., electronic files) based on calendar events (e.g., meetings of a user) in a networked computing environment (e.g., a cloud computing environment). In a typical embodiment a portion/segment (e.g., private cloud) of the networked computing environment may be designated for storing at least one electronic file to be shared (e.g., as stored in at least one computer storage device associated with the portion). The portion of the networked computing environment may then be associated (e.g., graphically) with an electronic calendar entry (e.g., a meeting having a set of attendees). Based on the calendar entry, a set of users (e.g., the meeting attendees) authorized to access the at least one electronic file may be determined based on the electronic calendar entry. Thereafter, access to the at least one electronic file may be authorized for the set of users (along with associated permission in an access control list (ACL) or the like).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
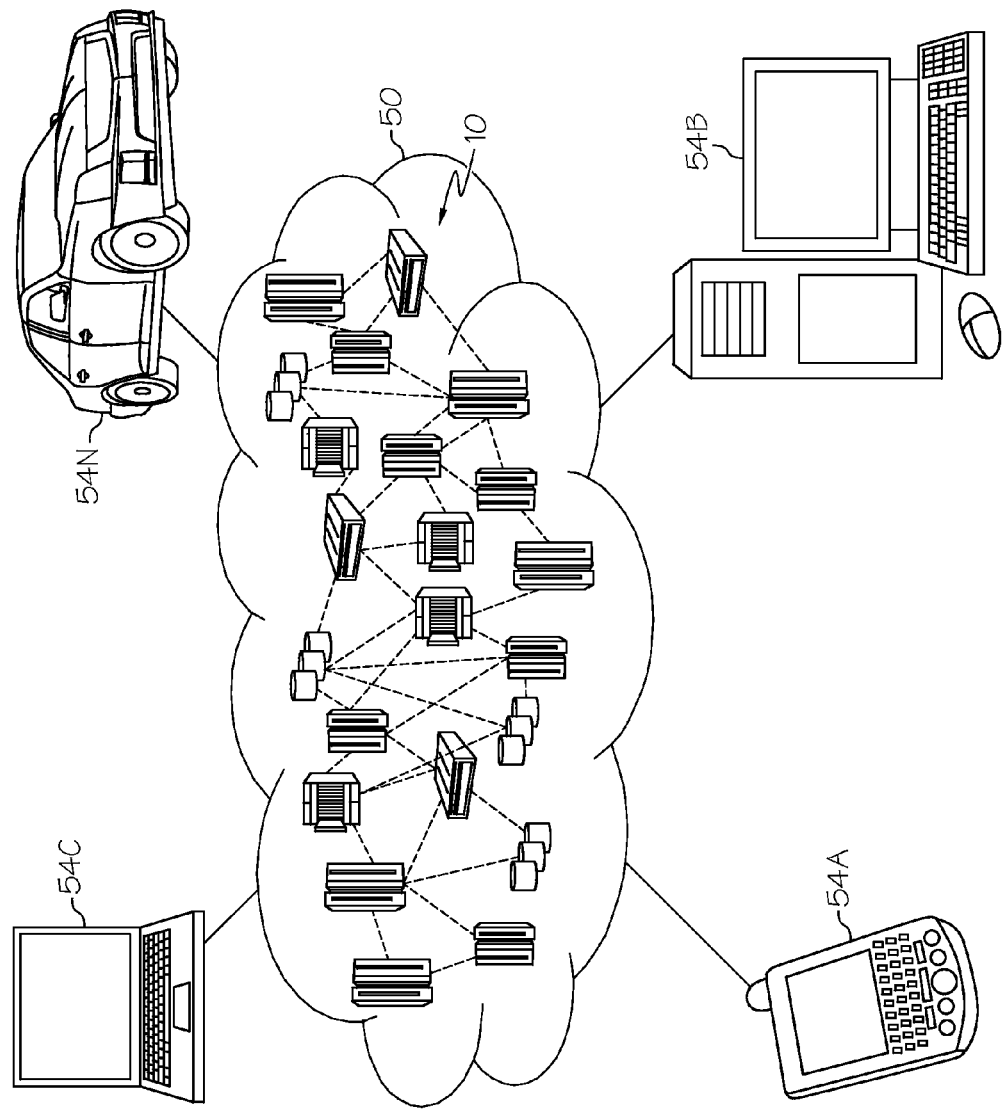
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
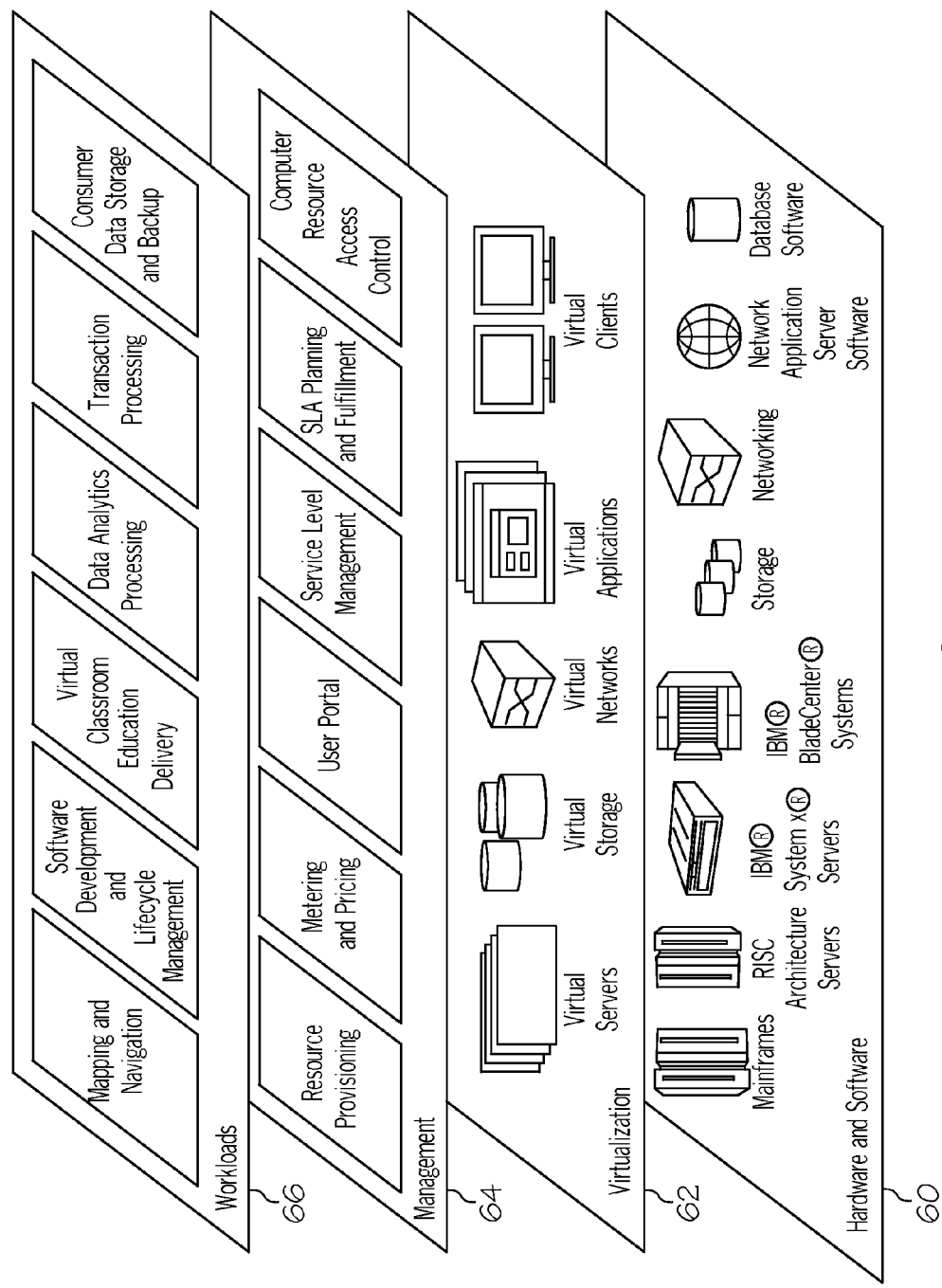
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is computer resource access control, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the computer resource access control functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
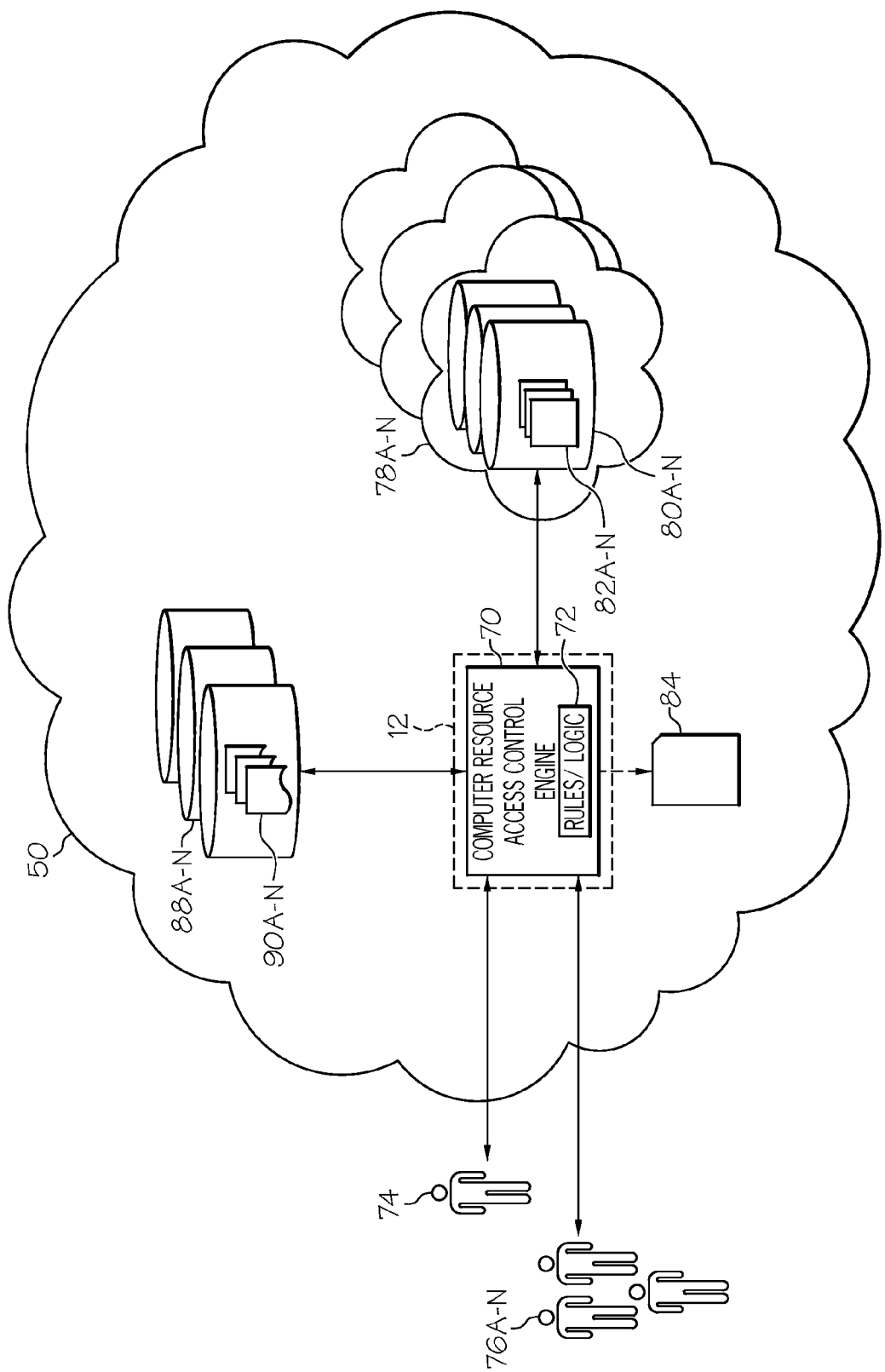
FIG. 4 depicts a system diagram according to an embodiment of the repent invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown in FIG. 4. In the event the teachings recited herein are practiced in a networked computing environment 86, each client need not have a computer resource access control engine (engine 70). Rather, engine 70 could be loaded on a server or server-capable device that communicates (e.g., wirelessly) with the clients to provide computer resource access control therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides computer resource access control hereunder.

Along these lines, engine 70 may perform multiple functions similar to a general-purpose computer. Specifically, among other functions, engine 70 may (among other things): designate a portion (e.g., private cloud(s) 78A-N) of networked computing environment 86 for storing at least one electronic file 82A-N (associated with an owner/user 74) to be shared (e.g., as store in a at least one computer storage device 80A-N associated with portion 78A-N); associate portion 78A-N of computer networked environment 86 with an electronic calendar entry 90A-N (e.g., a meeting as maintained in an electronic calendaring database(s) 88A-N or the like); determine a set of users 76A-N (e.g., meeting attendees) authorized to access at least one electronic file 82A-N based on electronic calendar entry 90A-N; authorize access to at least one electronic file 82A-N or set of users 76A-N; maintain set of users 76A-N in an access control list (ACL) 84; associate set of users 76A-N with a set of permissions in ACL 84 for interacting with at least one electronic file 82A-N; and/or modify set of users 76A-N or the set of permissions (e.g., in ACL 84) based upon changes to the electronic calendar event.

Illustrative Example

This section will describe an illustrative example in accordance with one embodiment of the present invention. It is understood that although this section describes the embodiment in the context of a cloud computing implementation, this need not be the case. Regardless, in a cloud computing embodiment, the process may proceed as follows:

1) A user (e.g., meeting moderator/leader/facilitator) may establish/designate a segment/portion of a private cloud and may populate the portion with files that the user wants shared with meeting attendees.
2) The user may then associate the private cloud with a meeting on the user's electronic calendar. The user may do this by viewing his/her calendar and selecting a meeting from his/her calendar.
3) When selecting the meeting, the meeting's attendees may be "extrapolated" from the meeting's invited and/or attendee list.
4) The meeting attendees may then be authorized to access the private cloud portion previously established by the moderator.
5) As the moderator removes or adds meeting attendees, the appropriate ACLs will be set to remove/add the attendee(s) from having access and/or certain permissions to the private cloud portion.

In one embodiment, the user may be able to add access to the private cloud for individuals who may not necessarily be invited to the meeting, but that the user would like for such individuals to have access to the private cloud portion.

Figure 5:
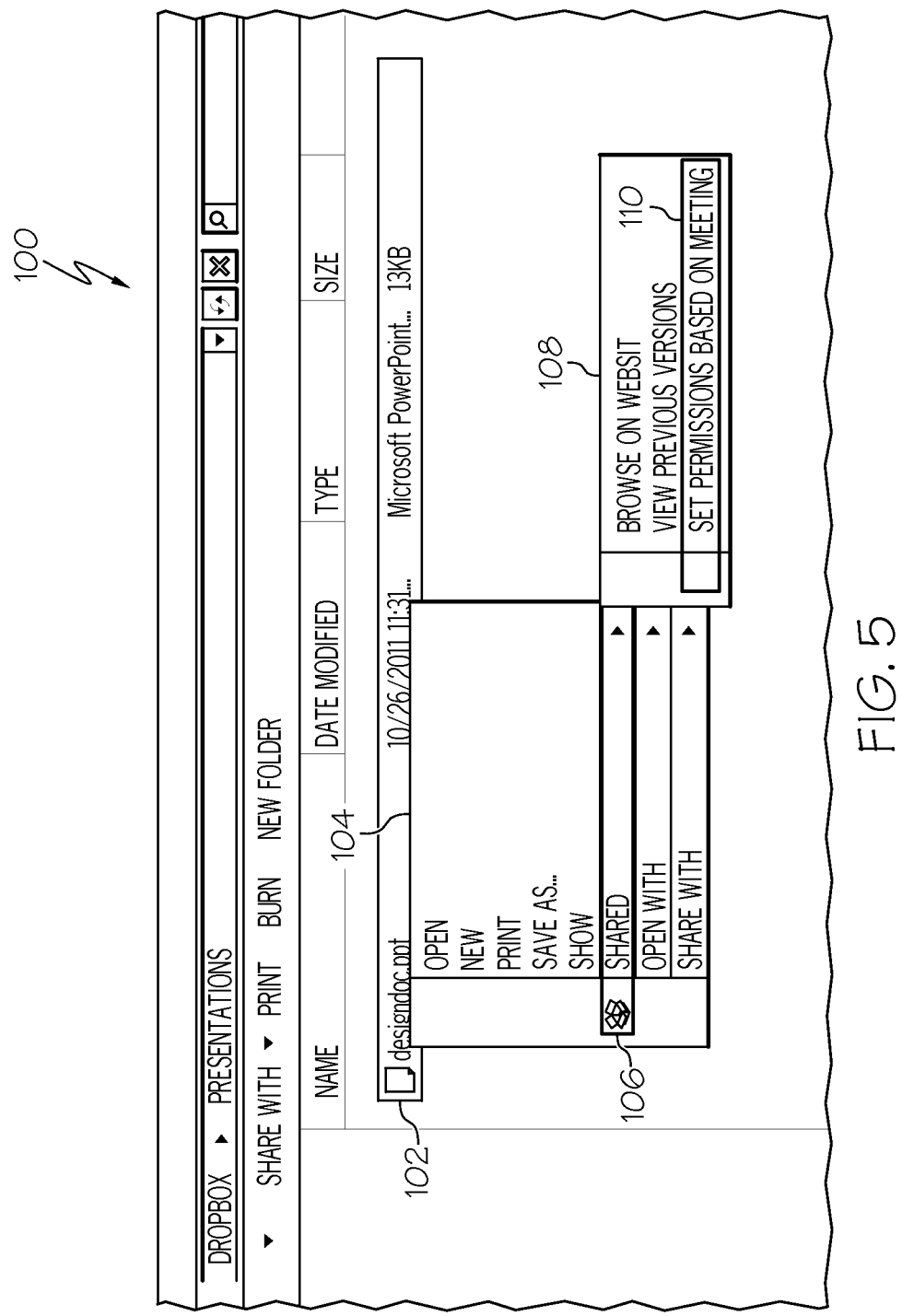
FIG. 5 depicts a diagram of a user interface for selecting a file for sharing according to an embodiment of the present invention.
Figure 6:
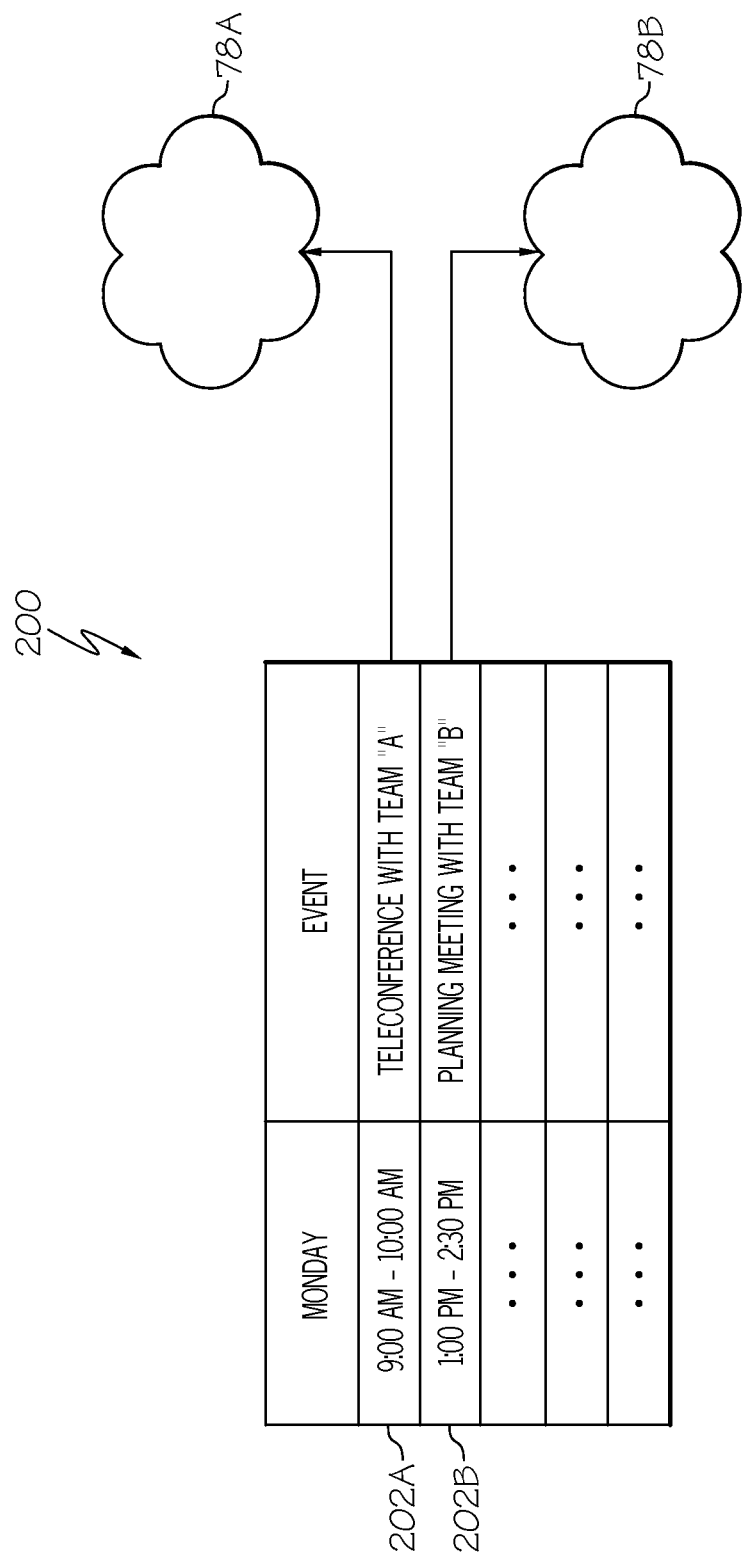
FIG. 6 depicts a diagram of a user interface for graphically associating calendar entries with networked computing environment portions according to an embodiment of the present invention.

Referring now to FIGS. 5-6, these concepts will be described in greater detail. Specifically, FIGS. 5-6 depicts various interfaces 100 and 200 (e.g., as provided by program 40 and/or engine 70) for graphically performing one or more of the functions described herein. In the example set forth, an interface 100 is displayed for selecting a particular file 102 ("designdoc.ppt") to be shared. Upon selecting file 102, a corresponding menu 104 may be displayed with sharing option 106. Upon selecting sharing option 106, the user will be presented with another menu 108 having a permission setting option 110. This option allows the user to specifically configure the meeting certain permissions for sharing file 102.

Once option 110 has been selected, the user may then be presented with a new option within his/her cloud storage area to set the permissions of the file based on a current meeting. Specifically, when option 110 has been selected, the user's calendar may be presented from which the user may select an existing meeting. Once a meeting/calendar event has been selected, the permissions of the cloud resource are updated as the participants of the meeting are changed.

FIG. 6 shows an interface 200 that graphically depicts the association of calendar events 202A-B with private clouds 78A-N (e.g., portions). It is understood that a calendar entry 202A-B may be associated with private cloud 78A-B and/or a specific file therein (i.e., a calendar entry is thus associated with a "computing resource" (e.g., file, cloud portion, database, etc.)). Along these lines, program 40 and/or engine 70 may provide a user with one or more interfaces (e.g., such as interfaces 200) for graphically making such associations. Once an association between a calendar entry (e.g., as defined in a meeting leader's electronic calendar) and a computing resource has been made, access to the computing resource may be authorized (and certain permissions assigned) for any users associated with the calendar entry (e.g., meeting attendees).

It is further understood that, using a meeting participant's invitee status, permissions may be updated accordingly. For example, a required user may have read/write/delete access, an optional user may have read/write access, and an information user may only have read access. Moreover, permissions may be removed after a meeting has occurred. For example, the file might only be accessible to the users for an hour before, during, and an hour after a meeting has ended. At this time the permissions may revert back to their original setting.

Figure 7:
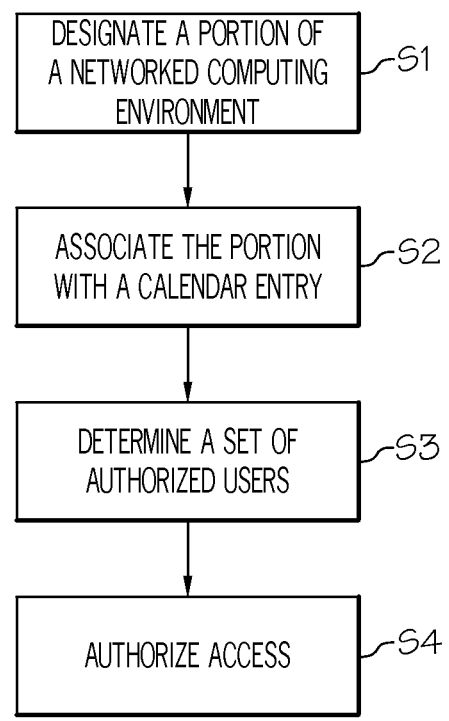
FIG. 7 depicts a method flow diagram according to an embodiment of the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

Referring now to FIG. 7, a method flow diagram according to an embodiment of the present invention is shown. In step S1, a portion of the networked computing environment for storing at least one electronic file to be shared is designated. In step S2, the portion of the networked computing environment is associated with an electronic calendar entry. In step S3, a set of users authorized to access the at least one electronic file is determined based on the electronic calendar entry. In step S4, access to the at least one electronic file is authorized for the set of users.

While shown and described herein as a computer resource access control solution, it is understood that the invention further provides various alternative embodiments. For example, in one embodiment, the invention provides a computer-readable/useable medium that includes computer program code to enable a computer infrastructure to provide computer resource access control functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide computer resource access control functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for computer resource access control. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for authorizing computing resource access based on calendar events in a networked computing environment, comprising:
    creating an electronic calendar entry corresponding to a meeting defined in a meeting leader's electronic calendar;
    designating a portion of the networked computing environment for storing at least one electronic cloud resource to be shared, the at least one electronic cloud resource being stored in at least one computer storage device associated with the portion;
    associating the portion of the networked computing environment with the electronic calendar entry and the at least one cloud resource;
    determining a set of users authorized to access the at least one electronic cloud resource from the at least one computer storage device via the private cloud based on the electronic calendar entry, the set of users being a set of attendees of the meeting;
    authorizing access to the portion for the set of users for a predetermined time period comprising at least a duration of the meeting;
    and revoking the access to the portion for the set of users at an end time of the predetermined time period;
    wherein the portion comprises a private storage cloud, and the networked computing environment comprises a cloud computing environment.

2. The computer-implemented method of claim 1, further comprising maintaining the set of users in an access control list (ACL).

3. The computer-implemented method of claim 2, further comprising associating the set of users with a set of permissions in the ACL for interacting with the at least one electronic cloud resource.

4. The computer-implemented method of claim 3, further comprising modifying the set of users or the set of permissions based upon changes to the electronic calendar entry.

5. The computer-implemented method of claim 1, further comprising storing the at least one electronic cloud resource in the at least one computer storage device.

6. A system for authorizing computing resource access based on calendar events in a networked computing environment, comprising: a memory medium comprising instructions; a bus coupled to the memory medium; and
a processor coupled to the bus that when executing the instructions causes the system to:
    create an electronic calendar entry corresponding to a meeting defined in a meeting leader's electronic calendar;
    designate a portion of the networked computing environment for storing at least one electronic cloud resource to be shared, the at least one electronic cloud resource being stored in at least one computer storage device associated with the portion;
    associate the portion of the networked computing environment with the electronic calendar entry and the at least one cloud resource;
    determine a set of users authorized to access the at least one electronic cloud resource from the at least one computer storage device via the private cloud based on the electronic calendar entry, the set of users being a set of attendees of the meeting;
    authorize access to the portion for the set of users for a duration of the meeting;
    and revoke the access to the portion for the set of users at an end time of the duration of the meeting;
    wherein the portion comprises a private storage cloud, and the networked computing environment comprises a cloud computing environment.

7. The system of claim 6, the memory medium further comprising instructions for causing the system to maintain the set of users in an access control list (ACL).

8. The system of claim 7, the memory medium further comprising instructions for causing the system to associate the set of users with a set of permissions in the ACL for interacting with the at least one electronic cloud resource.

9. The system of claim 8 the memory medium further comprising instructions for causing the system to modify the set of users or the set of permissions based upon changes to the electronic calendar entry.

10. The system of claim 6, the memory medium further comprising instructions for causing the system to store the at least one electronic cloud resource in the at least one computer storage device.

11. A computer program product for authorizing computing resource access based on calendar events in a networked computing environment, the computer program product comprising a computer readable storage device with a processor for executing program instructions stored on the computer readable storage device, to:
- create an electronic calendar entry corresponding to a meeting defined in a meeting leader's electronic calendar;
- designate a portion of the networked computing environment for storing at least one electronic cloud resource to be shared, the at least one electronic cloud resource being stored in at least one computer storage device associated with the portion;
- associate the portion of the networked computing environment with the electronic calendar entry and the at least one cloud resource;
- determine a set of users authorized to access the at least one electronic cloud resource from the at least one computer storage device via the private cloud based on the electronic calendar entry, the set of users being a set of attendees of the meeting;
- authorize access to the portion for the set of users for a predetermined time period comprising at least a duration of the meeting; and
- revoke the access to the portion for the set of users at an end time of the predetermined time period;
- wherein the portion comprises a private storage cloud, and the networked computing environment comprises a cloud computing environment.

12. The computer program product of claim 11, the computer readable storage device further comprising instructions to maintain the set of users in an access control list (ACL).

13. The computer program product of claim 12, the computer readable storage device further comprising instructions to associate the set of users with a set of permissions in the ACL for interacting with the at least one electronic cloud resource.

14. The computer program product of claim 13, the computer readable storage device further comprising instructions to modify the set of users or the set of permissions based upon changes to the electronic calendar entry.

15. The computer program product of claim 11, the computer readable storage device further comprising instructions to store the at least one electronic cloud resource in the at least one computer storage device.

16. A method for deploying a system for authorizing computing resource access based on calendar events in a networked computing environment, comprising:
providing a computer infrastructure being operable to:
- create an electronic calendar entry corresponding to a meeting defined in a meeting leader's electronic calendar;
- designate a portion of the networked computing environment for storing at least one electronic cloud resource to be shared, the at least one electronic cloud resource being stored in at least one computer storage device associated with the portion;
- associate the portion of the networked computing environment with the electronic calendar entry and the at least one cloud resource;
- determine a set of users authorized to access the at least one electronic cloud resource from the at least one computer storage device via the private cloud based on the electronic calendar entry, the set of users being a set of attendees of the meeting; and
- authorize access to the portion for the set of users for a duration of the meeting; and
- revoke the access to the portion for the set of users at an end time of the duration of the meeting;
- wherein the portion comprises a private storage cloud, and the networked computing environment comprises a cloud computing environment.

* * * * *